US011097872B2

(12) United States Patent
Evans (10) Patent No.: US 11,097,872 B2
(45) Date of Patent: Aug. 24, 2021

(54) COMPOSITE LID OF CONTAINER AND METHOD OF ATTACHING METAL LID TO PLASTIC LID TO FORM COMPOSITE LID OF CONTAINER

(71) Applicant: Altria Client Services LLC, Richmond, VA (US)

(72) Inventor: James D. Evans, Chesterfield, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 15/858,212

(22) Filed: Dec. 29, 2017

(65) Prior Publication Data

US 2019/0202608 A1 Jul. 4, 2019

(51) Int. Cl.
*B65D 43/02* (2006.01)
*A24F 23/00* (2006.01)
(Continued)

(52) U.S. Cl.
CPC ......... *B65D 43/0222* (2013.01); *A24F 23/00* (2013.01); *B65B 7/28* (2013.01); *B65D 43/0212* (2013.01); *B65D 51/1622* (2013.01); *B65D 2543/0074* (2013.01); *B65D 2543/00092* (2013.01); *B65D 2543/00231* (2013.01); *B65D 2543/00277* (2013.01); *B65D 2543/00296* (2013.01); *B65D 2543/00314* (2013.01); *B65D 2543/00527* (2013.01); *B65D 2543/00537* (2013.01); *B65D 2543/00629* (2013.01); *B65D 2543/00685* (2013.01); *B65D 2543/00796* (2013.01)

(58) Field of Classification Search
USPC ....... 206/245, 443, 203, 364, 365, 366, 370; 215/347, 346, 902; 220/507, 518, 517, 220/516, 514; 211/74, 71.01
See application file for complete search history.

(56) References Cited

U.S. PATENT DOCUMENTS 411,773 A    10/1889   Atkinson
663,415 A    12/1900   Charles
(Continued)

FOREIGN PATENT DOCUMENTS

CA    2684761 A1    11/2010
EP    1 201 553 A2   2/2002
(Continued)

*Primary Examiner* — Jacob K Ackun
(74) *Attorney, Agent, or Firm* — Harness, Dickey & Pierce, P.L.C.

(57) ABSTRACT

A composite lid of a cylindrical container includes an outer metal lid having an integral top wall and sidewall and an inner plastic lid having a top wall and sidewall fitted inside the outer metal lid such that a free end of the sidewall of the inner plastic lid extends beyond a free end of the sidewall of the outer metal lid. The composite lid can be fitted on a base having an integral bottom wall and sidewall such that the sidewall of the inner plastic lid frictionally engages the sidewall of the base. The outer metal lid can be formed by stamping sheet metal, the inner plastic lid can be formed by molding a polymer material and the base can be formed by molding a polymer material. The outer metal lid can be adhesively bonded or mechanically fitted to the inner plastic lid.

18 Claims, 5 Drawing Sheets

(51) Int. Cl.
  *B65D 51/16* (2006.01)
  *B65B 7/28* (2006.01)

(56) References Cited

U.S. PATENT DOCUMENTS

| | | | | |
|---|---|---|---|---|
| 1,882,278 | A * | 10/1932 | Francyk | B65D 41/0457 215/329 |
| 1,982,883 | A | 12/1934 | Richardson | |
| 2,023,341 | A | 12/1935 | Downes-Shaw et al. | |
| 2,047,951 | A | 7/1936 | Eberhart | |
| 2,047,977 | A | 7/1936 | McGowan | |
| 2,062,542 | A | 12/1936 | Warren | |
| 2,181,799 | A * | 11/1939 | Carvalho | B65D 41/02 215/346 |
| 2,718,323 | A * | 9/1955 | Kennedy | B65D 41/12 215/347 |
| 2,772,013 | A * | 11/1956 | Stover | B65D 43/0212 215/260 |
| 2,817,454 | A * | 12/1957 | Stover | B65D 41/02 215/346 |
| 2,864,528 | A | 12/1958 | Henchert | |
| 3,219,222 | A * | 11/1965 | Davidson | B65D 41/0435 215/334 |
| 3,270,904 | A * | 9/1966 | Curry | B65D 41/0435 215/318 |
| 3,516,565 | A * | 6/1970 | Hatkevich | B65D 41/0442 215/333 |
| 3,633,781 | A * | 1/1972 | Zapata | B65D 41/12 215/328 |
| 3,741,423 | A * | 6/1973 | Acton | B65D 41/0457 215/318 |
| 3,746,199 | A * | 7/1973 | Hart | B65D 41/08 215/256 |
| 3,788,510 | A * | 1/1974 | Collins | B65D 41/0435 215/341 |
| 3,930,589 | A * | 1/1976 | Koontz | B65D 51/145 215/352 |
| 4,011,962 | A | 3/1977 | Favell | |
| 4,228,909 | A * | 10/1980 | Lecinski, Jr. | B65D 43/0256 215/253 |
| 4,444,308 | A | 4/1984 | MacEwen | |
| 4,448,320 | A * | 5/1984 | Kapolas | B65D 53/02 215/346 |
| 4,603,786 | A * | 8/1986 | Lecinski, Jr. | B65D 41/0457 215/318 |
| 4,646,933 | A | 3/1987 | Jurczenia et al. | |
| 4,863,030 | A * | 9/1989 | Bayer | B65D 21/0209 206/427 |
| 5,542,557 | A | 8/1996 | Koyama et al. | |
| 5,868,273 | A | 2/1999 | Daenen et al. | |
| 6,403,173 | B1 | 6/2002 | Granger et al. | |
| 6,740,374 | B2 * | 5/2004 | Carballido | B32B 7/06 215/230 |
| 7,185,780 | B2 * | 3/2007 | Nomula | B65D 51/244 220/359.3 |
| 7,798,319 | B1 | 9/2010 | Bried et al. | |
| 7,878,324 | B2 | 2/2011 | Bellamah et al. | |
| 8,215,482 | B2 | 7/2012 | Cronin et al. | |
| 8,393,465 | B2 | 3/2013 | Clark et al. | |
| 8,440,023 | B2 | 5/2013 | Carroll et al. | |
| 8,458,996 | B2 | 6/2013 | Bried et al. | |
| 8,910,781 | B2 | 12/2014 | Pipes et al. | |
| 9,205,959 | B2 | 12/2015 | Welk et al. | |
| 9,265,287 | B2 | 2/2016 | Sims et al. | |
| 9,409,659 | B2 | 8/2016 | Carroll et al. | |
| 9,445,631 | B1 | 9/2016 | Patel et al. | |
| 9,497,922 | B1 | 11/2016 | Behm et al. | |
| 10,214,326 | B1 * | 2/2019 | Gilliam | B65D 41/349 |
| 2003/0102281 | A1 * | 6/2003 | Ryall | B65D 41/3438 215/252 |
| 2003/0189023 | A1 * | 10/2003 | Gonzalez | B65D 41/12 215/260 |
| 2006/0032831 | A1 * | 2/2006 | Major | B29C 43/18 215/350 |
| 2007/0110928 | A1 | 5/2007 | Bried et al. | |
| 2008/0202956 | A1 | 8/2008 | Welk et al. | |
| 2010/0000888 | A1 | 1/2010 | Cronin et al. | |
| 2010/0012534 | A1 | 1/2010 | Hoffman | |
| 2013/0008809 | A1 | 1/2013 | Cortez | |
| 2013/0233742 | A1 | 9/2013 | Bried et al. | |
| 2014/0197054 | A1 | 7/2014 | Pipes et al. | |
| 2014/0262870 | A1 | 9/2014 | Sims et al. | |
| 2015/0321787 | A1 | 11/2015 | Stebbins et al. | |
| 2017/0224012 | A1 | 8/2017 | Macko et al. | |

FOREIGN PATENT DOCUMENTS

| | | |
|---|---|---|
| GB | 727529 A | 4/1955 |
| JP | S6470369 A | 3/1989 |

* cited by examiner

COMPOSITE LID OF CONTAINER AND METHOD OF ATTACHING METAL LID TO PLASTIC LID TO FORM COMPOSITE LID OF CONTAINER

BACKGROUND

Smokeless tobacco is typically packaged in containers having a metal lid and plastic base. The metal lids are typically stamped.

SUMMARY

In an embodiment, a composite lid for a tobacco container comprises an outer metal lid having an integral top wall and cylindrical sidewall, and an inner plastic lid having a top wall and cylindrical sidewall fitted inside the outer metal lid such that a free end of the sidewall of the inner plastic lid extends beyond a free end of the sidewall of the outer metal lid. The composite lid can be fitted on a base having an integral bottom wall and cylindrical sidewall such that the sidewall of the inner plastic lid frictionally engages the sidewall of the base.

According to various options, (a) the outer metal lid is formed by stamping sheet metal, (b) the inner plastic lid is formed by molding a polymer material, and/or (c) the base is formed by molding a polymer material.

According to various further options, (a) the top wall of the outer metal lid is adhesively bonded to the top wall of the inner plastic lid, (b) the outer metal lid is mechanically fitted to the inner plastic lid by knurling the sidewall of the outer metal lid such that indentations are knurled into the sidewall of the outer metal lid and tips of the indentations penetrate an outer surface of the sidewall of the inner plastic lid, or (c) the outer metal lid includes at least one detent extending inwardly from the sidewall of the outer metal lid, the inner plastic lid including at least one recess engaging the at least one detent.

In an embodiment wherein the outer metal lid includes at least one detent, the at least one detent comprises a plurality of spring biased tabs and the at least one recess comprises an annular groove extending into the sidewall of the inner plastic lid, with tips of the plurality of spring biased tabs located in the annular groove. For example, the spring biased tabs can be defined by U-shaped cuts in the sidewall of the outer metal lid.

According to other various options, (a) the sidewall of the inner plastic lid includes at least one vertical groove configured to allow air to escape from a space between the top wall of the outer metal lid and the top wall of the inner plastic lid when the inner plastic lid is attached to the outer metal lid, (b) the inner plastic lid includes at least one transverse groove in the top wall of the inner plastic lid connected to the at least one vertical groove, and/or (c) the inner plastic lid includes a circular recess in the top wall of the inner plastic lid, the at least one transverse groove providing fluid communication between the at least one vertical groove and the circular recess.

In an embodiment, (a) a free end of the sidewall of the outer metal lid is located a predetermined distance from a free end of the sidewall of the inner plastic lid, (b) the free end of the sidewall of the outer metal lid is within 0.020 inch from the free end of the inner plastic lid, (c) the free end of the outer metal lid is not curled, or (d) the free end of the outer metal lid is curled inwardly.

In one embodiment, a cylindrical container comprises an outer metal lid having an integral top wall and cylindrical sidewall, a base having an integral bottom wall and cylindrical sidewall, an inner plastic lid having a top wall and cylindrical sidewall fitted inside the outer metal lid, and the outer metal lid is mechanically fitted to the inner plastic lid by knurling the sidewall of the outer metal lid such that a uniform pattern of indentations are knurled into the sidewall of the outer metal lid and tips of the indentations penetrate an outer surface of the sidewall of the inner plastic lid.

In another embodiment, a cylindrical container comprises an outer metal lid having an integral top wall and cylindrical sidewall, a base having an integral bottom wall and cylindrical sidewall, and an inner plastic lid having a top wall and cylindrical sidewall fitted inside the outer metal lid, the outer metal lid including at least one detent extending inwardly from the sidewall of the outer metal lid, the inner plastic lid including at least one recess engaging the at least one detent. For example, the at least one detent can comprise at least four spring biased tabs spaced circumferentially apart and the at least one recess can comprise an annular groove extending into the sidewall of the inner plastic lid with tips of the at least four spring biased tabs located in the annular groove.

DETAILED DESCRIPTION OF THE INVENTION

As used herein, the term "smokeless tobacco" denotes loose or wrapped tobacco products, including snus and moist snuff tobacco ("MST") in portioned and non-portioned forms.

As used herein "packaged smokeless tobacco" denotes smokeless tobacco that is contained in a package as would be handled by an adult tobacco consumer.

As used herein, the term "volatile flavor" denotes a flavor sufficiently volatile such that, when it is applied in a conventional amount to packaged smokeless tobacco in a conventional, non-hermetically sealed package, the average adult tobacco consumer would notice a substantial decrease in the magnitude of the flavor within a period of about a month or less after the package is opened. Exemplary volatile flavors include wintergreen, mint, as well as "original" flavor as used in smokeless tobacco.

As used herein, the term "about" when used in conjunction with a stated numerical value or range has the meaning reasonably ascribed to it by a person skilled in the art, i.e. denoting somewhat more or somewhat less than the stated value or range, to within a range of .+−.10% of the stated value.

Smokeless tobacco is typically packaged in a pocket-sized package. Preferably, the package or container may be opened and closed by an adult tobacco consumer in order to access the smokeless tobacco. The package may take one of various forms, such as a cylindrical can, box, tube, or the like. According to one embodiment, smokeless tobacco is packaged in a cylindrical can taking the form of a flat cylinder with a tight, friction-fitted lid. Preferably such a can is not hermetically sealed. Optionally, the lid may be screwed on with a threaded fitting.

In conventional smokeless tobacco containers, the lid is a metal stamping of sheet metal such as thin steel. Exposure of the lid to the smokeless tobacco may potentially lead to oxidation of the metal lid. To minimize or avoid oxidation, an inner plastic lid can be attached to a metal outer lid as described below. This assembly also stiffens the lid resulting in a more premium package with superior seal to the can.

According to an embodiment, a tobacco container comprises an outer metal lid having an integral top wall and sidewall, a base having an integral bottom wall and sidewall, and an inner plastic lid having a top wall and sidewall fitted inside the outer metal lid such that a free end of the sidewall of the inner plastic lid extends beyond a free end of the sidewall of the outer metal lid. The inner plastic lid can be attached to the outer metal lid by various methods as described below.

The inner plastic lid can be attached to the outer metal lid by adhesive bonding or mechanically via engagement of the outer metal lid with the inner plastic lid. For example, glue can be applied to mating surfaces of the inner plastic lid and/or outer metal lid or the inner plastic lid can be mechanically joined to the outer metal lid by deforming the sidewall of the outer metal lid such that one or more projections engage the sidewall of the inner plastic lid or the outer metal lid can include one or more preformed detents which engage one or more recesses in the inner plastic lid. To allow for escape of air when the inner plastic lid is attached to the outer metal lid, one or more vented grooves can be provided in the sidewall of the inner plastic lid and/or the sidewall of the outer metal lid. For example, one or more vertical grooves can be provided on an outer surface of the sidewall of the inner plastic lid to allow air to escape when the inner plastic lid is pressed into the outer metal lid. If the inner plastic lid includes a circular recess in the top wall, one or more transverse grooves can be provided in a rim extending around the top wall to connect the vertical grooves to the circular recess.

Figure 1:
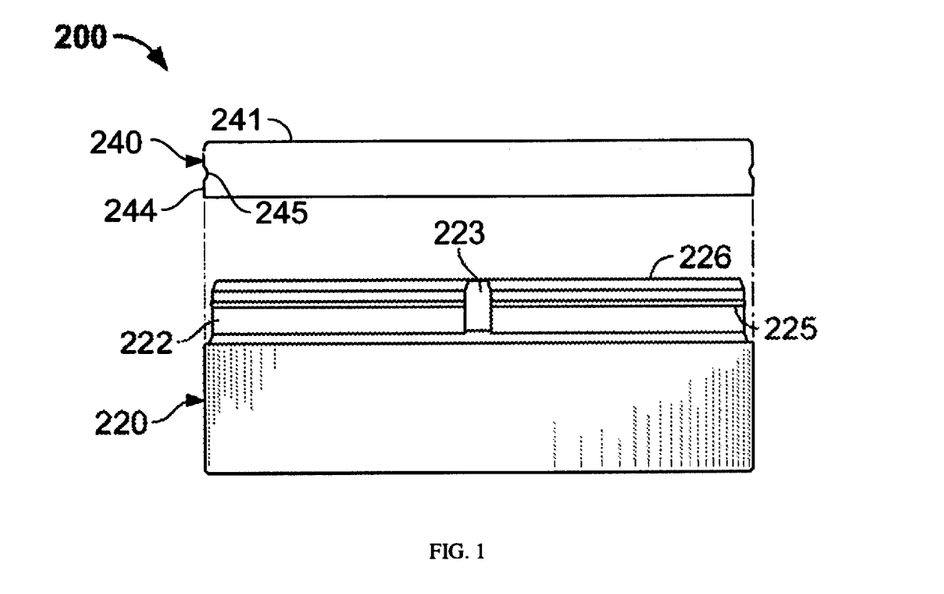
FIG. 1 illustrates a cylindrical container having a base and lid.

FIG. 1 depicts a cylindrical container 200 having a base 220 and composite lid 240 with an interior for holding an adult tobacco consumer product such as smokeless tobacco pouches or moist smokeless tobacco. The composite lid 240 includes a metal outer lid and inner plastic lid wherein the inner plastic lid is bonded and/or mechanically attached to the outer metal lid. Lid 240 mates with the top peripheral region 222, (also referred to herein as a "rim") at the top of the sidewall of the base 220 and can be configured to provide, for example, a snap-fit, a slide-lock, and/or a screw-on engagement. For example, the lid 240 can include a top wall 241, a sidewall 244, and an inner projection 245 in the sidewall 244 which engages an outer projection 225 on the rim 222 of the base 220. When an upper end 226 of the base 220 is inserted into the lid 240, air can escape via vertical vent groove 223 until the inner projection 245 snaps over the outer projection 225. The base 220 and lid 240 can be separated from one another so that an adult tobacco consumer can have access to the product contained therein. The interior space provided by the base 220 and the lid 240 can be moisture tight to prevent the product such as pouches of smokeless tobacco, and/or other types of product, from drying out. In some cases, the container can be air-tight (hermetically sealed) as delivered from the manufacturer. If desired, the lid 240 and base 220 can form a non-hermetic seal. U.S. Pat. No. 7,798,319 to Bried et al., which is incorporated in its entirety herein by reference, describes various embodiments of a tobacco product package including aspects related to sealing the package with a non-hermetic seal. In some cases, the container provided herein can include non-tobacco products such as an herbal composition that can be a non-tobacco product. Herbs and other edible plants can be categorized generally as culinary herbs (e.g., thyme, lavender, rosemary, coriander, dill, mint, peppermint) and medicinal herbs (e.g., Dahlias, Cinchona, Foxglove, Meadowsweet, Echinacea, Elderberry, Willow bark). Such non-tobacco compositions can have a number of different primary ingredients, including but not limited to, tea leaves, red clover, coconut flakes, mint leaves, ginseng, apple, corn silk, grape leaf, and basil leaf. U.S. Pat. No. 7,950,399 to Winterson et al., which is incorporated herein by reference, discloses a non-tobacco pouch product.

Figure 2:
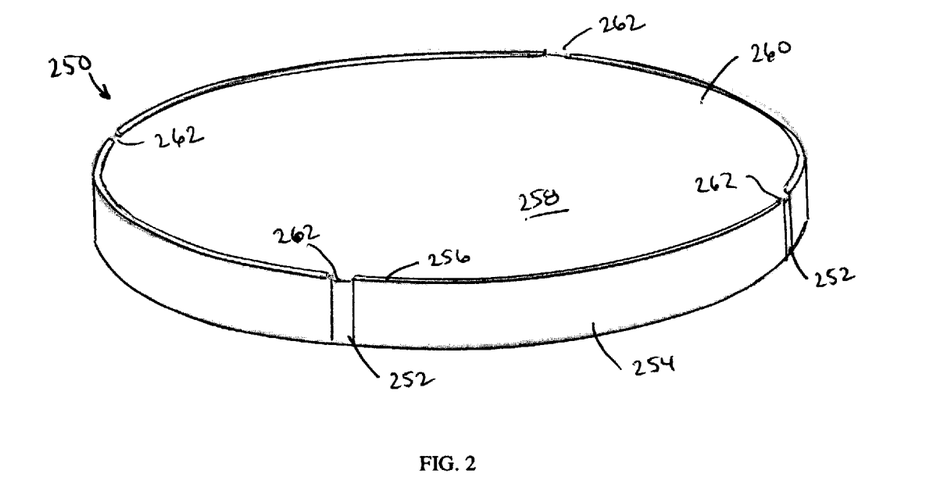
FIG. 2 illustrates an inner plastic lid with venting according to one embodiment.

FIG. 2 shows an embodiment of an inner plastic lid 250 which can be adhesively bonded to an outer metal lid (not shown). One method of attaching these parts is to place multiple beads of glue between the structures just prior to assembly. Due to the flexible nature of the inner plastic lid, it is preferred to complete this process offline from the smokeless tobacco packaging operation. For example, the outer metal lid can be firmly supported and the inner plastic lid 250 can be pressed down into the outer metal lid such that the top walls of the lids are pressed closer together and the sidewall of the inner plastic lid is tight against the sidewall of the outer metal lid. Due to the tight fit of these two parts, one or more vented grooves 252 can be provided in the outer surface of the sidewall 254 of the inner plastic lid 250 to allow air to escape from between the two parts. The vented groove 252 can comprise one or more vertical grooves in the outer surface of the sidewall 254 of the inner plastic lid 250. If the inner plastic lid 250 includes an upper rim 256 and circular recess 258 inwardly of the rim 256 on the outer surface of the top wall 260, one or more transverse grooves 262, such as four evenly spaced transverse grooves 262, can be provided in the rim 256 to connect to the one or more vertical grooves 252 such as four evenly spaced vertical grooves 252 in the sidewall 254. When attached, the outer metal lid can be pressed in a vertical direction over the inner plastic lid 250 such that the rim 256 is pressed against the inner surface of the top wall of the outer metal lid.

Figure 3:
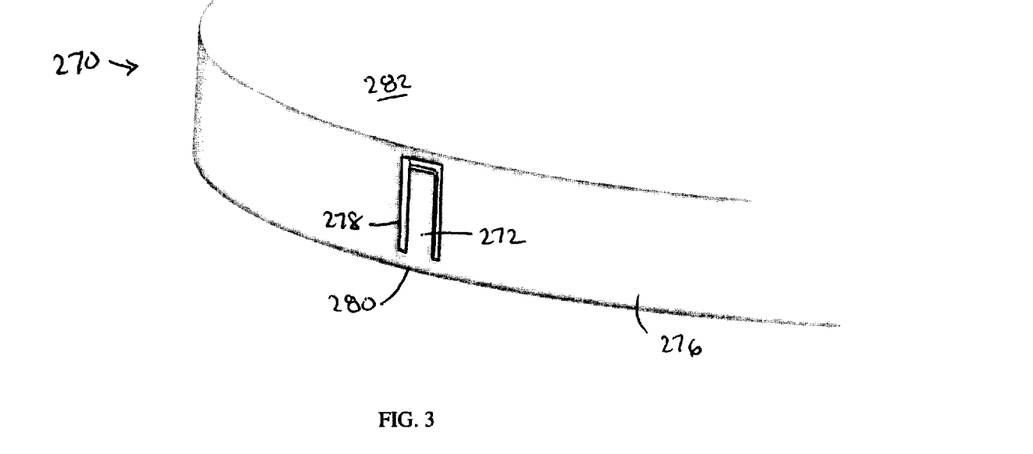
FIG. 3 illustrates an outer metal lid having a spring biased tab for attaching the outer metal lid to an inner plastic lid according to an embodiment.
Figure 4:
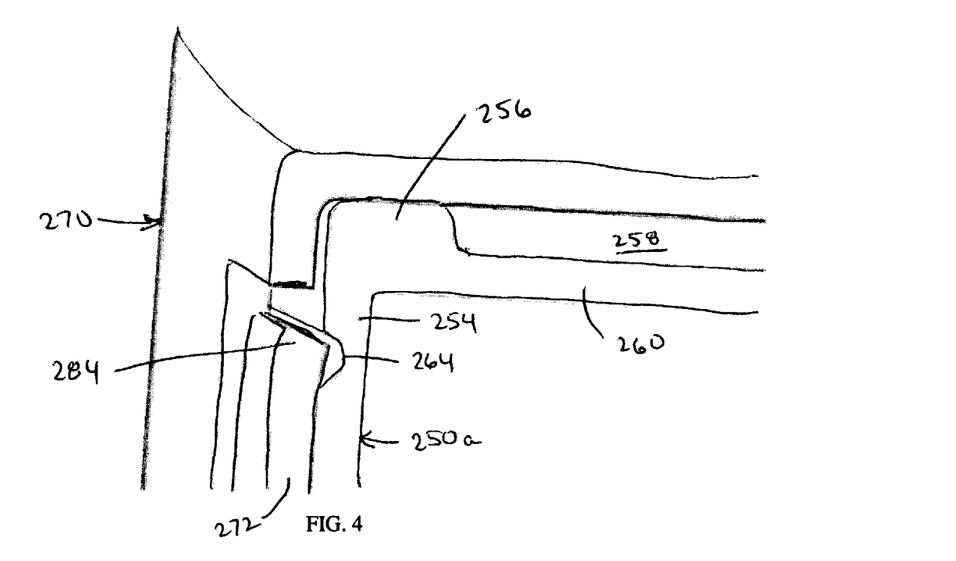
FIG. 4 illustrates a container having an outer metal lid with spring biased tabs attaching the outer metal lid to an inner plastic lid according to an embodiment.
Figure 6:
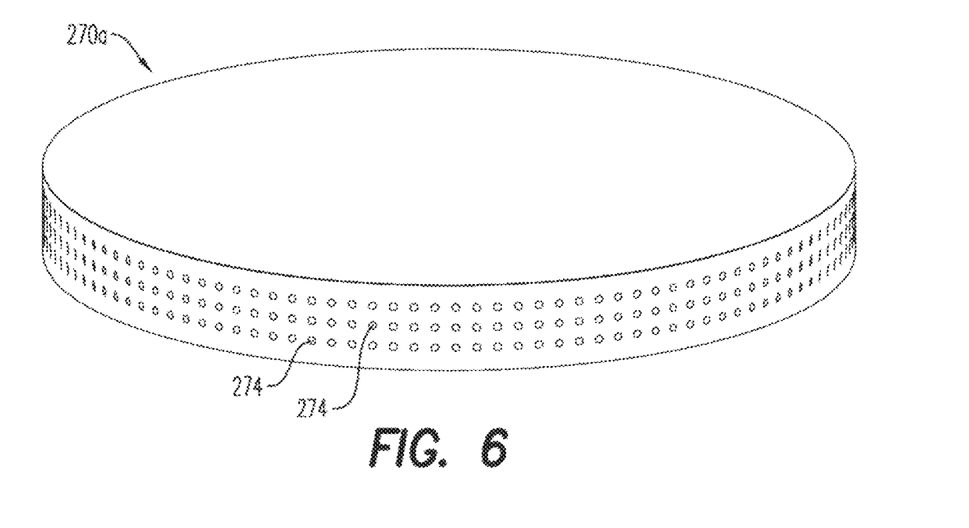
FIG. 6 illustrates an outer metal lid having a knurled pattern of indentations which mechanically attach the outer metal lid to an inner plastic lid according to an embodiment.

The composite lid 240 can be constructed such that the inner plastic lid 250 is adhesively bonded and/or mechanically attached to the outer metal lid. For example, an outer metal lid 270 can be attached to an inner plastic lid 250a using spring biased tabs 272 (also referred to as "detents"), as shown in FIGS. 3 and 4, wherein tips 284 of the spring biased tabs 272 are engaged with a depression 264 in the sidewall 254 of the inner plastic lid 250a. Another method of attaching these parts is to apply adhesive between the top walls of the outer metal lid and the inner plastic lid 250. A further method of attaching these parts is by placing the inner plastic lid inside the outer metal lid and knurling the sidewall of the outer metal lid 270a against the sidewall of the inner plastic lid 250, as shown in FIG. 6, wherein indentations 274 in sidewall 276 form projections on the inner surface of the sidewall 276 that penetrate into the outer surface of the sidewall 254 of the inner plastic lid 250. For example, when the two lids are assembled, using a dial table concept, the sidewall 276 of the outer metal lid 270a can be completely knurled from the outside around its perimeter to establish a mechanical connection between the inner plastic lid 250 and the outer metal lid 270a. The knurling can deform the sidewall 276 of the outer metal lid 270a to provide a uniform pattern of projections which penetrate the sidewall 254 of the inner plastic lid 250. The knurling can optionally provide an increased gripping surface to allow easier removal of the assembled lid 270a from the base 220 of the container 200. Due to the tight fit of these two parts, one or more vented grooves 252 can be provided to allow air to escape from between the two parts. The vented groove 252 can comprise one or more vertical grooves in the outer surface of the sidewall 254 of the inner plastic lid 250. If the inner plastic lid 250 includes an upper rim 256 and circular recess 258 inwardly of the rim 256 on the outer surface of the top wall 260, one or more transverse grooves 262 can be provided in the rim 256 to connect to the one or more vertical grooves 252 in the sidewall 254.

Figure 5:
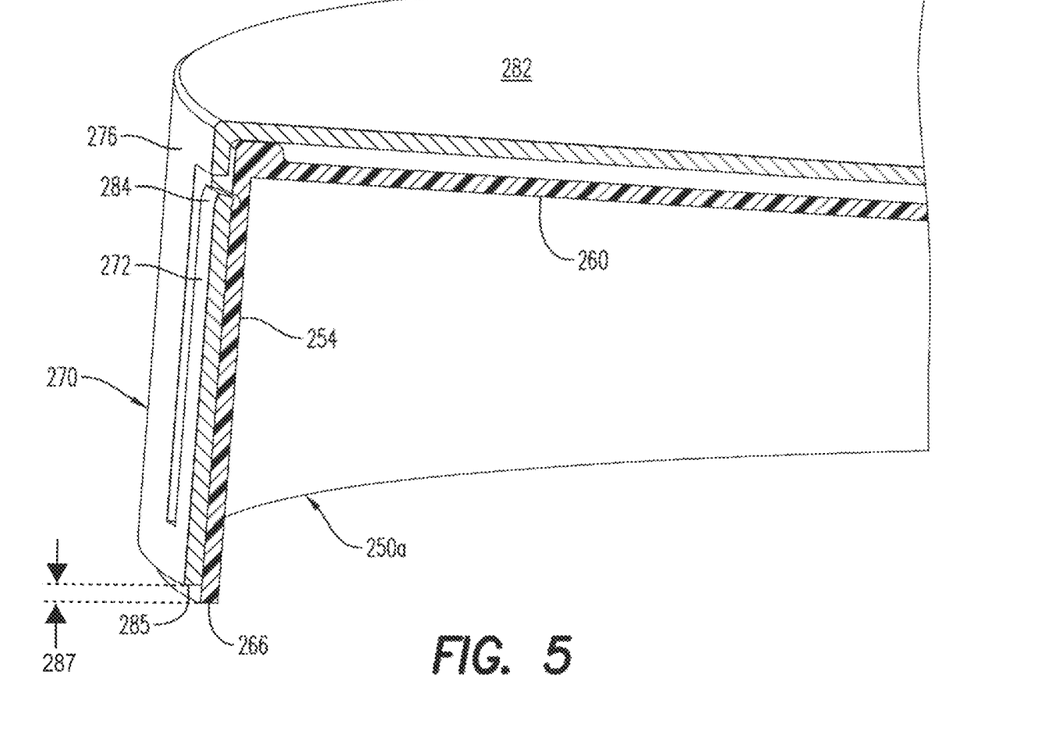
FIG. 5 is a cutaway view of the container shown in FIG. 4 showing how a spring biased tab engages a recess in an inner plastic lid according to an embodiment

FIG. 3 illustrates an embodiment of a cylindrical container in which the inner plastic lid (not shown) is mechanically attached to the outer metal lid 270 by one or more detents 272. For example, the detents 272 can be formed by making an elongated cut 278 in the sidewall 276 of the outer metal lid 270. As shown in FIG. 3, the cut 278 can be an upside down U-shaped cut extending from close to a free end 280 of the sidewall 276 to close to the top wall 282 of the outer metal lid 270. The detents 272 can be bent inwardly at their tips such that they are in the form of spring biased tabs 272 with optional inwardly extending projections at their tips 284 which engage one or more recesses 264 such as an annular groove in the outer surface of the sidewall 254 of the inner plastic lid 250a, as shown in FIG. 4. For ease of attachment, the sidewall 254 of the inner plastic lid 250a can include a single annular groove 264 extending around the sidewall 254 near the top wall 260 of the inner plastic lid 250a. During assembly, the inner plastic lid 250a can be pressed into the outer metal lid 270 until the one or more detents 272 snap into the annular groove 264, as shown in FIG. 4. FIG. 5 illustrates an enlarged view of the outer metal lid 270 mechanically attached to the inner plastic lid 250a such that a free end 285 of the outer metal lid 270 is spaced a predetermined distance 287 from a free end 266 of the inner plastic lid 250a. Due to the tight fit of these two parts, one or more vented grooves 252 can be provided to allow air to escape from between the two parts. The vented groove 252 can comprise one or more vertical grooves in the outer surface of the sidewall 254 of the inner plastic lid 250a. If the inner plastic lid 250a includes an upper rim 256 and circular recess 258 inwardly of the rim 256 on the outer surface of the top wall 260, one or more transverse grooves 262 can be provided in the rim 256 to connect to the one or more vertical grooves 252 in the sidewall 254.

Figure 7:
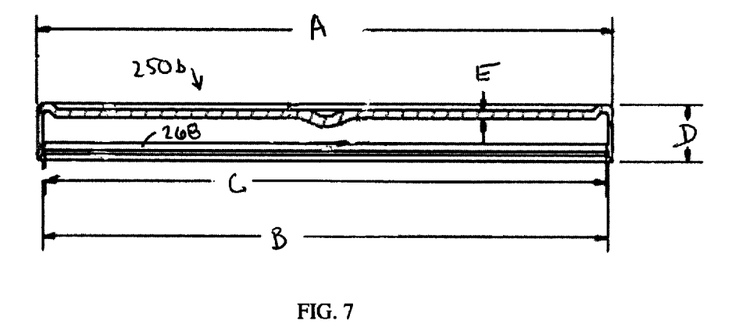
FIG. 7 illustrates an inner plastic lid having a locking bead for engaging a rim on a base according to an embodiment.
Figure 8:
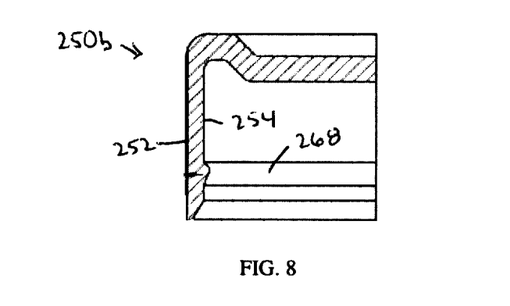
FIG. 8 is an enlarged view of the sidewall of the inner plastic lid shown in FIG. 7 according to an embodiment.
Figure 9:
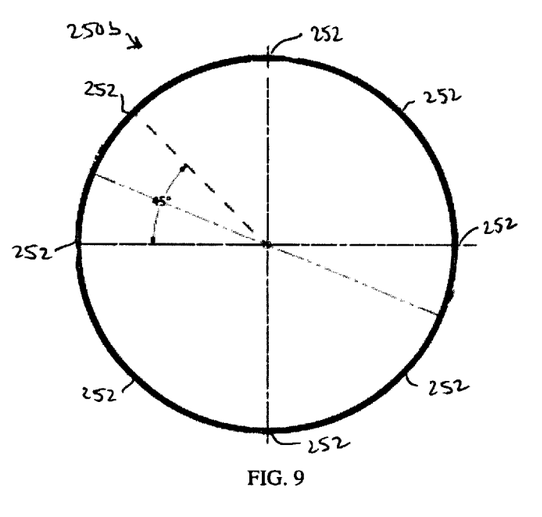
FIG. 9 is a top view of the inner plastic lid shown in FIG. 7 according to an embodiment.
Figure 10:
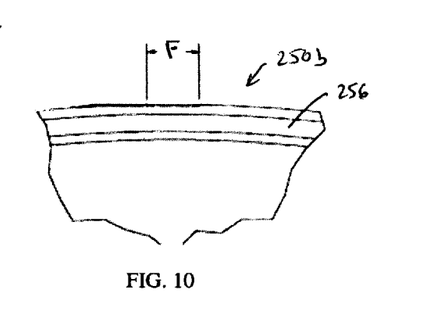
FIG. 10 is an enlarged view of the sidewall of the inner plastic lid shown in FIG. 7 according to an embodiment.

FIG. 7 illustrates an embodiment of an inner plastic lid 250b having an inwardly extending projection 268 forming a locking bead for attaching the composite lid 200 to the base 220. In an exemplary embodiment, the sidewall 254 of the inner plastic lid 250b can have an outer diameter "A" of about 2.577 inches and an inner diameter "B" of about 2.528 inches, the locking bead 268 can have an inner diameter "C" of about 2.513 inches, the sidewall can have a height "D" of about 0.255 inch, and the top wall 260 can have a wall thickness "E" of about 0.035 inch. FIG. 8 shows an enlarged portion of the inner plastic lid 250b shown in FIG. 7 wherein a vent groove 252 extends vertically along an outer surface of the sidewall 254. The depth of the vent groove 252 into the sidewall 254 can be about 0.002 inch. As shown in FIG. 9, the inner plastic lid 250b can have eight vent grooves 252 spaced about 45° apart. As illustrated in FIG. 10, each vent groove 252 can have a width "F" of about 0.047 inch.

Figure 11:
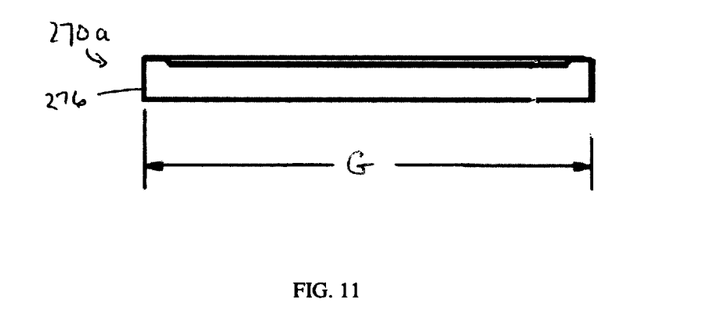
FIG. 11 illustrates an outer metal lid according to an embodiment.
Figure 12:
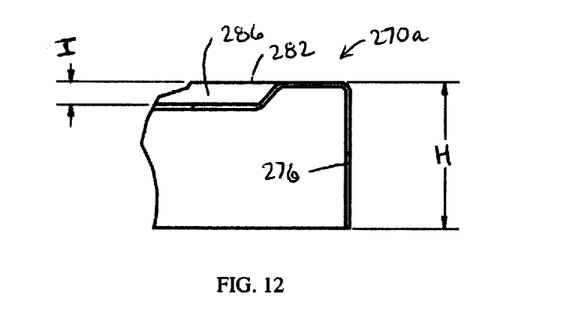
FIG. 12 is an enlarged view of the sidewall of the outer metal lid shown in FIG. 11 according to an embodiment.

FIG. 11 illustrates an exemplary outer metal lid 270a wherein sidewall 276 has an outer diameter "G" of about 2.584 inches. FIG. 12 is an enlarged view of the outer metal lid 270a shown in FIG. 11 wherein the sidewall 276 has a height "H" of about 0.255 inch and a recess 286 in the top wall 282 has a depth "I" of about 0.040 inch. The outer metal lid can be a stamped piece of steel sheet such as "tinplate" having a thickness of about 0.008 inch.

Although the invention has been described with reference to particular embodiments and examples, it should be understood that various modifications can be made without departing from the spirit of the invention. The various parts of the disclosure including the abstract, summary, and the title are not to be construed as limiting the scope of the present invention, as their purpose is to enable the appropriate authorities, as well as the general public, to quickly determine the general nature of the invention. Unless the term "means" is expressly used, none of the features or elements recited herein should be construed as means-plus-function limitations.

What is claimed is:

1. A composite lid of a cylindrical container comprising:
   an outer metal lid having a top wall and a cylindrical sidewall, the top wall and the cylindrical sidewall being integral; and
   an inner plastic lid including,
      a top wall including an upper rim and a circular recess, and
      a cylindrical sidewall, the inner plastic lid being fitted inside the metal lid, such that a free end of the cylindrical sidewall of the inner plastic lid extends beyond a free end of the cylindrical sidewall of the outer metal lid.

2. The composite lid of claim 1, wherein the outer metal lid is formed by stamping sheet metal.

3. The composite lid of claim 1, wherein the inner plastic lid is formed by molding a polymer material.

4. The composite lid of claim 1, wherein the outer metal lid is mechanically fitted to the inner plastic lid by knurling the cylindrical sidewall of the outer metal lid, such that indentations are knurled into the cylindrical sidewall of the outer metal lid and tips of the indentations penetrate an outer surface of the cylindrical sidewall of the inner plastic lid.

5. The composite lid of claim 1, wherein the outer metal lid includes at least one detent extending inwardly from the cylindrical sidewall of the outer metal lid, the inner plastic lid including at least one recess engaging the at least one detent.

6. The composite lid of claim 5, wherein the at least one detent comprises a plurality of spring biased tabs and the at least one recess comprises an annular groove extending into the cylindrical sidewall of the inner-plastic lid, tips of the plurality of spring biased tabs located in the annular groove.

7. The composite lid of claim 6, wherein the spring biased tabs are defined by U-shaped cuts in the cylindrical sidewall of the outer metal lid.

8. The composite lid of claim 1, wherein the cylindrical sidewall of the inner plastic lid includes at least one vertical groove configured to allow air to escape.

9. The composite lid of claim 8, wherein the inner plastic lid includes at least one transverse groove along the upper rim of the inner plastic lid connected to the at least one vertical groove, the at least one transverse groove providing fluid communication between the at least one vertical groove and the circular recess.

10. The composite lid of claim 1, wherein the free end of the cylindrical sidewall of the outer metal lid is located a desired distance from the free end of the cylindrical sidewall of the inner plastic lid.

11. The composite lid of claim 10, wherein the free end of the cylindrical sidewall of the outer metal lid is within 0.020 inch from the free end of the inner plastic lid.

12. The composite lid of claim 11, wherein the free end of the outer metal lid is not curled.

13. The composite lid of claim 11, wherein the free end of the outer metal lid is curled inwardly.

14. A cylindrical container comprising:
a base including, an integral bottom wall and cylindrical base sidewall and the composite lid of claim 1, wherein an interior of the base contains adult tobacco consumer products and the composite lid of claim 1 is fitted on the base such that the cylindrical sidewall of the inner plastic lid frictionally engages the cylindrical base sidewall.

15. The composite lid of claim 1, wherein the upper rim is against an inner surface of the top wall of the outer metal lid.

16. The composite lid of claim 8, wherein the at least one vertical groove includes four vertical grooves in fluid communication with one another.

17. The composite lid of claim 16, wherein the four vertical grooves are evenly spaced.

18. The composite lid of claim 8, wherein a portion of the cylindrical sidewall of the inner plastic lid without the vertical groove has a substantially constant radius between the upper rim and the free end.

* * * * *